United States Patent
Johansson et al.

(10) Patent No.: US 9,526,198 B2
(45) Date of Patent: Dec. 27, 2016

(54) SUSPENSION UNIT FOR AGRICULTURAL IMPLEMENT, AGRICULTURAL IMPLEMENT, METHOD OF MANUFACTURING A SUSPENSION UNIT AND USE OF A BEARING UNIT

(71) Applicant: Vaderstad-Verken AB, Vaderstad (SE)

(72) Inventors: Henrik Johansson, Vikingstad (SE); Mikael Edvinsson, Boxholm (SE); Crister Stark, Vaderstad (SE)

(73) Assignee: Vaderstad-Verken AB, Vaderstad (SE)

( * ) Notice: Subject to any disclaimer, the term of this patent is extended or adjusted under 35 U.S.C. 154(b) by 0 days.

(21) Appl. No.: 14/422,945

(22) PCT Filed: Aug. 21, 2013

(86) PCT No.: PCT/SE2013/050982
§ 371 (c)(1),
(2) Date: Feb. 20, 2015

(87) PCT Pub. No.: WO2014/031067
PCT Pub. Date: Feb. 27, 2014

(65) Prior Publication Data
US 2015/0189824 A1    Jul. 9, 2015

(30) Foreign Application Priority Data
Aug. 22, 2012 (SE) ..................... 1250945

(51) Int. Cl.
*A01B 71/04* (2006.01)
*F16C 19/06* (2006.01)
(Continued)

(52) U.S. Cl.
CPC ............. *A01B 61/046* (2013.01); *A01B 71/04* (2013.01); *F16C 19/06* (2013.01); *F16C 19/08* (2013.01); *F16C 27/066* (2013.01)

(58) Field of Classification Search
CPC ......... F16C 27/00; F16C 27/06; F16C 27/066; A01B 61/04; A01B 61/00; A01B 61/046; A01B 71/04
(Continued)

(56) References Cited

U.S. PATENT DOCUMENTS 1,980,580 A    11/1934  Gilmore
2,102,415 A *  12/1937  Herreshoff ............. B60K 17/24
                                              180/381
(Continued)

FOREIGN PATENT DOCUMENTS

CH    306441 A    4/1955
FR    575839 A    8/1924
(Continued)

OTHER PUBLICATIONS

International Search Report for International Application No. PCT/SE2013/050982, mailed Dec. 4, 2013.
(Continued)

*Primary Examiner* — John G Weiss
(74) *Attorney, Agent, or Firm* — Olive Law Group, PLLC (57) ABSTRACT

A suspension unit for an agricultural implement, the suspension unit includes a bearing unit. The bearing unit contains an inner sleeve and an outer sleeve which is rotatable relative to said inner sleeve, and a friction-reducing member arranged between the inner sleeve and the outer sleeve. The suspension unit further includes a spring element, arranged radially outside the outer sleeve, and a holder which forms a spring chamber in which the spring element is accommodated. The spring element is fixed in the spring chamber between a circumferential, radially outwardly open groove, which is integrated with the outer sleeve, and a radially inwardly open groove, which surrounds the outer sleeve.

16 Claims, 5 Drawing Sheets

(51) Int. Cl.
*F16C 27/06* (2006.01)
*A01B 61/04* (2006.01)
*F16C 19/08* (2006.01)

(58) Field of Classification Search
USPC ........ 172/264, 497, 498; 384/536, 535, 582, 384/581
See application file for complete search history.

(56) References Cited

U.S. PATENT DOCUMENTS

| | | | | |
|---|---|---|---|---|
| 2,653,063 | A | * | 9/1953 | Arndt .................. F16C 27/066 384/536 |
| 2,902,321 | A | * | 9/1959 | Fayette ................ F16C 27/066 384/536 |
| 3,141,710 | A | * | 7/1964 | Lehman ............... F16C 23/084 384/477 |
| 3,415,500 | A | * | 12/1968 | Pethis .................. F16C 27/066 126/113 |
| 4,249,782 | A | | 2/1981 | Frank |
| 4,905,771 | A | | 3/1990 | Stark |
| 4,993,850 | A | * | 2/1991 | Howse .................. A01B 71/04 384/157 |
| 9,103,372 | B2 | * | 8/2015 | Ciulla .................. A01B 71/04 |
| 2002/0081047 | A1 | * | 6/2002 | Zoppitelli ............ F16C 23/084 384/495 |

FOREIGN PATENT DOCUMENTS

| | | |
|---|---|---|
| JP | H04300416 A | 10/1992 |
| SE | 457225 B | 12/1988 |
| SE | 501706 C2 | 5/1992 |

OTHER PUBLICATIONS

Written Opinion for International Application No. PCT/SE2013/050982, mailed Apr. 12, 2013.
Supplementary European Search Report for European Patent Application No. EP 13 83 0350 dated Mar. 14, 2016.

* cited by examiner

SUSPENSION UNIT FOR AGRICULTURAL IMPLEMENT, AGRICULTURAL IMPLEMENT, METHOD OF MANUFACTURING A SUSPENSION UNIT AND USE OF A BEARING UNIT

CROSS REFERENCE TO RELATED APPLICATIONS

This application is a 35 USC 371 application of International PCT Patent Application No. PCT/SE2013/050982, filed on Aug. 21, 2013, which claims priority to Swedish Patent Application No. 1250945-01 filed Aug. 22, 2012; all of the contents of which are hereby incorporated by reference herein in their entireties.

TECHNICAL FIELD

The present document relates to a suspension unit for an agricultural implement, to a method of manufacturing such a suspension unit, and to the use of a bearing unit in an agricultural implement.

BACKGROUND

Many types of agricultural implements have tilling tools in the form of disk implements (harrow disks, sowing disks, etc.), rollers (ring roller, drum roller, compactor member, etc.) or the like, and comprise one or more axles which are rotatable relative to the frame of the agricultural implement. Older machine types were often provided with fixed, unsprung axles. With increasing machine size, tilling speed and operating safety requirements, such fixed axles have proved to have certain deficiencies, since the stresses resulting from variations in the hardness and surface structure of the tilled soil, as well as collision with rocks, become increasingly strong with increasing machine size and tilling speed, which can lead to damage or cause breakdowns.

One way of reducing such problems is to provide the axle of the implement with mechanical suspension or rubber mounting.

A rubber mounting of this kind is shown in SE457225B. This type of solution protects the implement from breakdowns and helps to prolong the service life of the bearing by damping of bangs and jolts. Bangs on and tensions in the frame are also reduced. In practice, the rubber body is vulcanized in place in the outer sleeve of the bearing. When the vulcanization becomes loose the rubber body ages, or if the bearing breaks both the rubber body and the bearing must therefore be replaced.

There is therefore a requirement for a suspension construction which is more service-friendly and preferably less expensive.

SUMMARY

One object of the present document is to provide a suspension construction which eliminates the problems with the prior art. Specific requirements comprise providing a suspension construction which is less expensive and more service-friendly.

The invention is defined by the appended independent patent claims. Embodiments emerge from the dependent patent claims, from the following description and from the drawings.

According to a first aspect, a suspension unit for an agricultural implement, comprising a bearing unit containing an inner sleeve and an outer sleeve which is rotatable relative to said inner sleeve, and a friction-reducing member arranged between the inner sleeve and the outer sleeve, is provided. The suspension unit further comprises a spring element, arranged radially outside the outer sleeve, and a holder which forms a spring chamber in which the spring element is accommodated. The spring element is fixed in the spring chamber between a circumferential, radially outwardly open groove, which is integrated with the outer sleeve, and a radially inwardly open groove, which surrounds the outer sleeve.

By "integrated" is meant that the parts are firmly fixed together, such as formed in one piece or otherwise permanently fixed to one another (for example by welding, gluing, soldering, etc.).

By fixing the spring element between two grooves, a releasable fixing is produced, so that holder, spring element and/or bearing can be selectively replaced. Both production components and spare parts can thus be made more cheaply. Moreover, the vulcanization operation, which constitutes an expensive production step, is eliminated. Since a component with vulcanized joint is eliminated, a suspension unit which has higher strength and improved service life is instead provided.

The radially inwardly open groove can be formed by the holder. By making the holder form the inwardly open groove, the number of parts is reduced.

The radially outwardly open groove can be formed in one piece with the outer sleeve. By making the radially outwardly open groove be formed in one piece with the outer sleeve, the number of parts is reduced.

The radially outwardly open groove can be formed in a separate part, which is fixed relative to the outer sleeve.

The holder can comprise first and second holder parts, which in the joined-together state form the spring chamber. By making two holder parts jointly form the spring chamber, a structure which is simple in production terms and also service-friendly is achieved.

The holder parts can be joined together along a plane which is substantially perpendicular to a rotational axis of the bearing unit.

At least one of the holder parts can have a substantially flat portion and a, relative to the flat portion, countersunk portion, which forms a part of the spring chamber.

The holder can be formed by a first portion, which is substantially flat, and a second portion, which defines the spring chamber. The second portion can thus singly define the spring chamber. The two portions can be permanently joined to each other.

The spring element can comprise at least one material body, which at least partially is situated radially outside the outer sleeve.

The material body can be formed substantially of rubber or rubber-like material. By such materials are meant, as non-limiting examples, natural rubber, synthetic rubber, thermoplastic elastomers, elastic polyurethane, such as TPU, etc., and combinations thereof.

The radially outwardly open groove can have a radius of curvature in an axial plane which is larger than the largest radial thickness of the outer sleeve.

The radially outwardly open groove can have a radius of curvature in an axial plane which is at least 10%, preferably at least 20% or at least 30%, of an axial width of the outer sleeve.

Said friction-reducing member can comprise at least one rolling body, and the inner sleeve and the outer sleeve can have respective raceways.

The spring element, when this is received in the spring chamber, can be at least partially radially and/or axially compressed. Thus the spring element is deformed and contains tensions even when the spring element is unloaded.

According to a second aspect, an agricultural implement comprising a suspension unit according to that which has been described above is provided, which suspension unit is arranged for cushioning between a rotatable soil engaging or tilling part and a frame of the agricultural implement.

The rotatable soil engaging or tilling part can be connected to the frame by at least two suspension units.

At least one of the holder parts can be formed by cutting to size and shaping of a flat metal blank, preferably a metal sheet.

According to a third aspect, a method of mounting a bearing unit in an agricultural implement is provided, which method comprises providing a bearing comprising an inner sleeve and an outer sleeve which is rotatable relative to said inner sleeve, arranging a spring element in a circumferential, radially outwardly open groove integrated with the outer sleeve, so that the spring element is substantially fixed both axially and radially relative to the outer sleeve, and axially clamping the spring element in a spring chamber which is formed in a holder, so that the spring element is substantially fixed both axially and radially relative to the spring chamber.

The method can comprise forming the holder by joining together the first and second holder parts so that the spring element is clamped at least axially between the holder parts.

Alternatively, the method can comprise forming a part of the holder which defines the spring chamber in one piece of material.

According to a fourth aspect, a method of manufacturing an agricultural implement is provided, which method comprises forming at least one holder part for a bearing unit by shaping of a flat metal blank, so that the holder part forms at least a part of a spring chamber, and installing the bearing unit according to the assembly method above, so that the holder is formed at least partially by the holder part.

By forming one or both holder parts by shaping of a flat metal blank, a part which is relatively cheap to produce is obtained.

According to a third aspect, use of a bearing unit containing an inner sleeve, an outer sleeve which is rotatable relative to said inner sleeve, and a friction-reducing member arranged between the inner sleeve and the outer sleeve is provided, wherein a circumferential, radially outwardly open groove is integrated with the outer sleeve, for cushioning between a rotatable soil engaging or tilling part and a frame of an agricultural implement.

DESCRIPTION OF EMBODIMENTS

Figure 1:
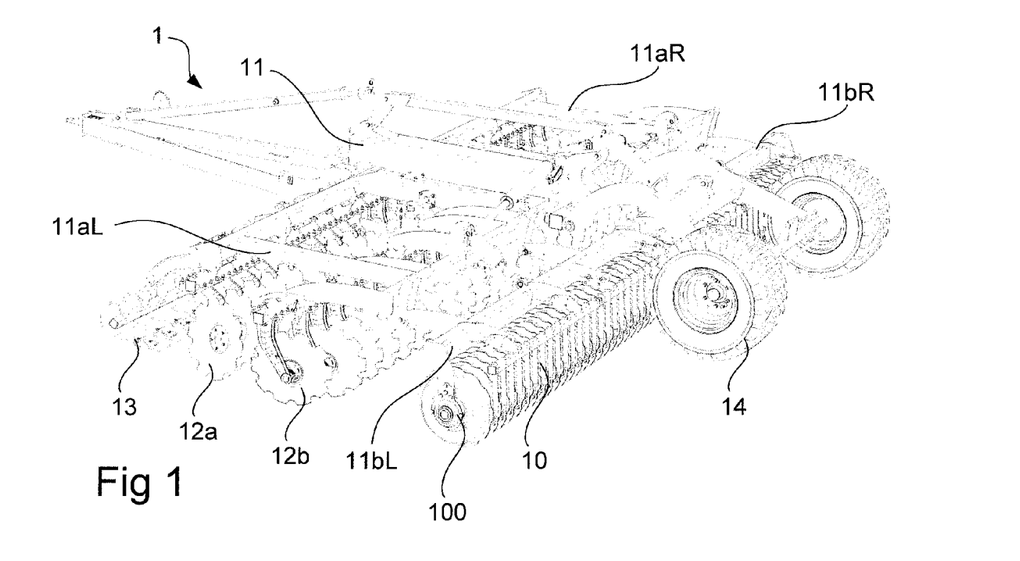
FIG. 1 is a schematic perspective view of an agricultural implement.

FIG. 1 shows an agricultural implement in the form of a disk implement, which is configured to be towed behind a towing vehicle (not shown), such as a tractor. The agricultural implement comprises a frame 11, a compacting roller 10, wheels 14 for adjustment of depth maintenance and transport, tilling tools, here in the form of disks 12a, 12b, and leveling implements 13 of such type as is marketed by the Applicant under the trademark CROSSBOARD®. The frame 11 can comprise a left-hand section 11aL and a right-hand section 11aR. The frame 11 can further comprise respective roller frame sections 11bL and 11bR. By dividing the frame 11 into left-hand sections 11aL, 11bL and right-hand sections 11aR and 11bR, lowering of the implement from a working position (FIG. 1) into a transport position (not shown), in which the width of the implement can be substantially less than in the working position, is enabled.

It will be appreciated that the agricultural implement can comprise a single whole frame; a divided frame having 1, 2, 3 or more hinged sections. In all cases, the tilling tool can be fastened by means of a suspension unit directly in the frame, or in an auxiliary frame, as is the case with the roller frame shown in FIG. 1.

Between the compacting roller 10 and the frame 11 is arranged a suspension device 100, the purpose of which is to alleviate jolts which occur in the event of, for example, variations in the level or hardness of the tilled ground and collision with rocks. The service life of both the compacting roller and the frame can thereby be improved, resulting in improved operating safety. In the example shown, the compacting roller 10 can be suspended relative to the frame with two or more suspension devices 100.

Figure 2:
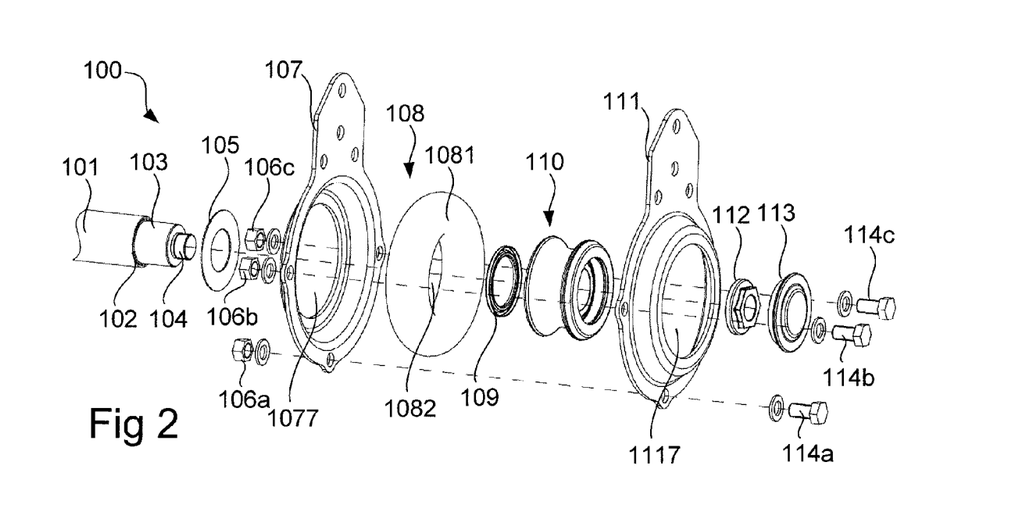
FIG. 2 is a schematic exploded diagram in perspective view of a suspension device forming part of the agricultural implement in FIG. 1.
Figure 3:
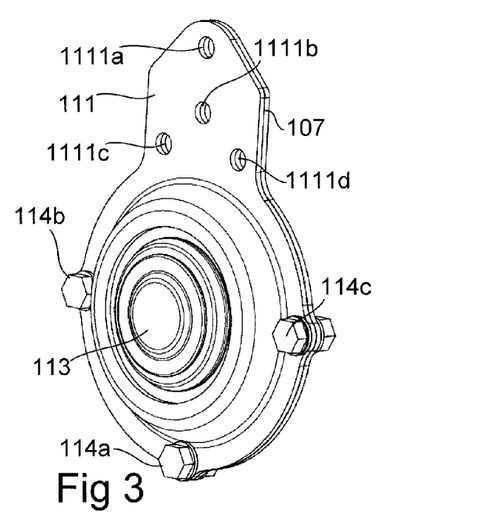
FIG. 3 is a schematic perspective view of the suspension device in FIG. 2.
Figure 4:
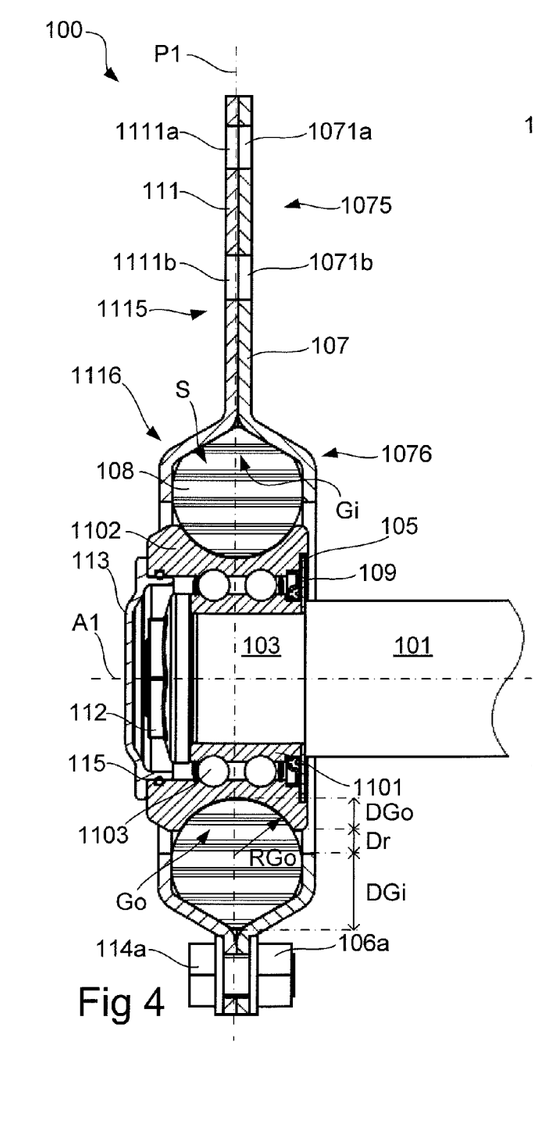
FIG. 4 is a schematic sectional view of the suspension device in FIGS. 2 and 3.

In FIGS. 2-4 is shown a first embodiment of the suspension device 100. The suspension device comprises a bearing unit 110, a spring element 108 and first and second holder parts 107, 111. The suspension device 100 can be mounted on an axle 101, for example on an axle provided with a narrow portion 103 so that a circumferential lip 102 is formed, which lip can act as an axial stop for the bearing unit 110. In addition, a first cover plate 105 can be configured as a plate having a through hole, the diameter of which corresponds to the narrower portion 103 of the axle. The plate can have an outer diameter corresponding to an axial recess in one of the sleeves 1101, 1102 of the bearing unit 110. In addition, a sealing ring 109 (for example of rubber or rubber-like material) can be arranged for axial sealing of the bearing unit 110. A hub bolt 112 can be arranged to engage with a threaded outer portion 104 of the axle 101 in order to achieve an axial locking of the bearing unit relative to the axle 101. A second cover plate 113 can be arranged to prevent dirt from penetrating into the bearing unit 110. The cover plate can be fixed by means of a press-fit (for example with the aid of an O-ring 115), a snap fastening or a locking ring.

The suspension device 100 can further comprise first and second holder parts 107, 111, which can be configured as a pair of compression-molded or cast parts, which have a respective flat portion 1075, 1115 and a portion 1076, 1116 which is countersunk relative to the respective flat portion. The countersunk portions can have axial openings 1077, 1117, intended for lead-through of the axle 101 or for access for fitting of a hub bolt 112 and/or cover plate 113. In the embodiment shown, the holder parts 107, 111 are identical. As an alternative, the holder parts can be configured as a pair of mirror-inverted parts. It will also be appreciated that the holder parts do not necessarily have to be identical, but can be configured, for example, as a first substantially flat part and a second part having a flat portion and a countersunk portion, and in which this countersunk portion defines the whole of the chamber for the spring element.

The flat portions 1075, 1115 can form a mounting portion, with which the suspension device can be fastened relative to the frame 11.

The countersunk portions 1076, 1116 together define a spring chamber S, in which the spring element 108 can be fitted. The spring chamber can be configured such that the spring element 108 can be installed under compression axially and/or radially, so that the spring element 108 is clamped in one or more directions.

The spring element 108 is formed preferably of rubber or rubber-like material, which has the advantage of having both resilient and damping (hysteresis) properties.

The spring chamber S can be substantially rotationally symmetric. Alternatively, the spring chamber can have one or more protrusions (not shown), which project into the spring chamber S and which can give rise to local major compressions or dimensional changes of the spring element 108. As a further alternative or complement, such protrusions can engage with recesses in the periphery of the spring element in such a way as will be described with reference to FIGS. 5 and 6. As a further alternative, the spring chamber can be divided into a plurality of sub-chambers, wherein one or more spring elements are arranged in each sub-chamber.

The holder parts 107, 111 can be joined together with fastening elements 106a-106c; 114a-114c, such as bolt joints, as is shown in FIGS. 2-4.

The holder parts 107, 111 can form a radially inwardly open, circumferential groove Gi. The groove Gi can be continuous around the whole of its outer periphery. Alternatively, the groove Gi can be discontinuous. The shape of the groove Gi can be tailored for contact against the radially outwardly facing surface of the spring element 108. For example, recesses and/or protrusions in the walls of the groove can be configured to coincide with protrusions or recesses in the outwardly facing surface of the spring element 108.

The groove Gi can generally be configured with such a shape and such dimensions that a sufficient axial locking relative to the spring element 108 can be achieved. The depth DGi of the groove can be at least 10%, preferably at least 20% or at least 30% of the radial thickness of the spring element 108, calculated from its inner contact surface to its outer contact surface.

The bearing unit 110 can comprise an inner race 1101 and an outer race 1102, as well as intervening friction-reducing members, such as rolling bodies, slide bearings or a hydrostatic bearing device. As is commonly known, the inner race and the outer race can comprise respective raceways for contact against rolling bodies. In the embodiment shown, the outer race 1102 is formed with a radially outwardly open, circumferential groove Go. The groove Go can be continuous around the whole of the periphery of the outer race. Alternatively, the groove can be discontinuous. The shape of the groove can be tailored for contact against the radially inwardly facing surface of the spring element 108. For example, recesses and/or protrusions in the walls of the groove can be configured to coincide with protrusions or recesses in the inwardly facing surface of the spring element 108.

The groove Go can generally be configured with such a shape and such dimensions that a sufficient axial locking relative to the spring element 108 can be achieved. According to one embodiment, the groove Go can have a radius of curvature RGo in an axial plane (FIG. 4) which is larger than a largest radial thickness of the outer sleeve 1102. For example, the groove can have a surface which is curved in the axial plane and which has a radius of curvature RGo which is greater than 10%, preferably at least 20% or at least 30% of an axial width of the outer sleeve 1102. The depth DGo of the groove can be at least 10%, preferably at least 20% or at least 30% of the radial thickness of the spring element 108 calculated from its inner contact surface to its outer contact surface.

As an alternative to an outer race 1102 having a radially outwardly open, circumferential groove Go, a standard "smooth" outer race can be used, on which an extra part (not shown) having the groove Go is arranged. The extra part can be arranged on such an outer race with the aid of radial press-fit, glue, welding, soldering, axially acting clamping joints, etc.

Between a radially inner portion of the holder parts 107, 111 and a radially outer portion of the outer race (the wall which forms the groove Go) is a distance Dr, which defines the largest theoretically possible radial movement between the bearing unit 110 and the holder parts 107, 111 and which provides a possibility for the spring element 108 to expand when subjected to a compressive force in the course of assembly and/or when subjected to load. A further such "expansion chamber" can be formed in the (radially viewed) outer portion of the spring chamber S between the parts 107, 111.

The suspension unit 100 can be assembled as follows.

A bearing unit 110, comprising an inner sleeve 1101 and an outer sleeve 1102 which is rotatable relative to said inner sleeve, is arranged in the center of one or more spring elements 108, so that a circumferential, radially outwardly open groove Go, integrated with the outer sleeve 1102, receives a (radially viewed) inner portion of the spring element 108. The spring body 108 can be threaded onto the bearing unit 110 substantially axially. This engagement can be facilitated by the use of lubricant, such as soap, detergent, oil or the like.

The spring element 108 is hereby fixed both axially and radially relative to the outer sleeve 1102.

A next step can be to axially and/or radially clamp the spring element relative to the holder.

According to one embodiment, the spring element 108 is clamped in a spring chamber S which is formed in a holder, so that the spring element 108 is substantially fixed both axially and radially relative to the spring chamber S. The holder can in turn be formed by two parts 107, 111 described according to the above, which parts are joined together in the axial direction so that the spring element 108 is clamped at least axially.

It will be appreciated that, while the above description shows the use of a single-row or double-row radial ball bearing, other types of bearing can also be used, such as, arbitrarily, a single-row or multi-row roller bearing, slide bearing or hydrostatic bearing. An angular contact bearing can be especially suitable.

The spring element shown in FIGS. 2-4 is constituted by a rotationally symmetric body of circular cross section and with a rotational axis situated outside the circular cross section. Other cross sections than circular, for example the cross section can be polygonal (triangular, rectangular, square, etc.) or elliptical.

Figure 5:
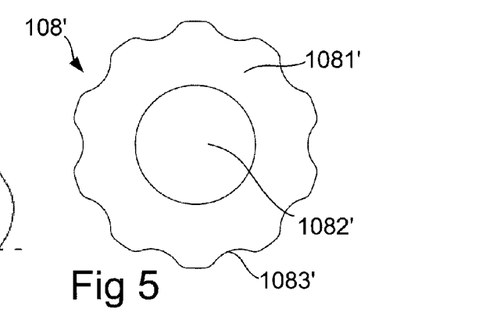
FIG. 5 is a schematic plan view of a first alternative embodiment of a spring body which can be used in the suspension device in FIGS. 2-4.

In FIG. 5 is shown a spring element 108' having a spring body 1081' and a center hole 1082'. The radially outwardly facing surface of the spring body has a plurality of radial recesses 1083'. These recesses can be, but do not necessarily have to be, fitted in corresponding radially inwardly extending protrusions in the groove Gi.

The spring elements 108, 108' according to FIGS. 2-4 and 5 have a substantially isotropic spring characteristic under radial load from different angles.

Figure 6:
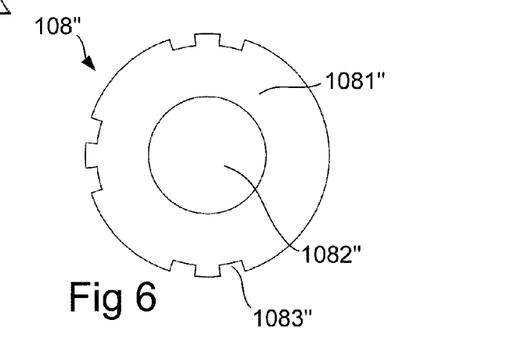
FIG. 6 is a schematic plan view of a second alternative embodiment of a spring body which can be used in the suspension device in FIGS. 2-4.

In FIG. 6 is shown an embodiment of a spring element 108" having a spring body 1081" and a center hole 1082", but having non-symmetrically arranged, radially inwardly extending recesses. This spring element thereby has an anisotropic spring characteristic under load from different radial directions.

It will thus be appreciated that the spring element can have an anisotropic spring characteristic. For example, the spring body can be made stiffer under substantially horizontally radial loads than under substantially vertically radial loads in order thereby to allow upward springing upon collision with an obstacle, but to limit springing in substantially horizontal directions. As an alternative or complement, the spring element can have different characteristics under load from the rotational axis and downward or upward.

For example, a geometry and/or spring characteristic similar to that which is shown in SE457225B can be achieved.

According to further embodiments, the spring element can be constituted by a body which in the non-loaded (non-deformed) state is substantially polygonal (triangular, rectangular, square, etc.), elliptical (oval), etc. When subjected to load, the body can be deformed such that it wholly or partially follows the shape of one or both grooves Gi, Go.

According to further embodiments, the spring element can be constituted by two or more spring element parts, which can be arranged adjacent to (possibly in contact with) one another along the grooves Gi, Go, or which can be arranged at a distance apart along the grooves Gi, Go. The spring element parts can be connected to one another by, for example, glue, vulcanization or one or more connecting parts.

Figures 7, 8:
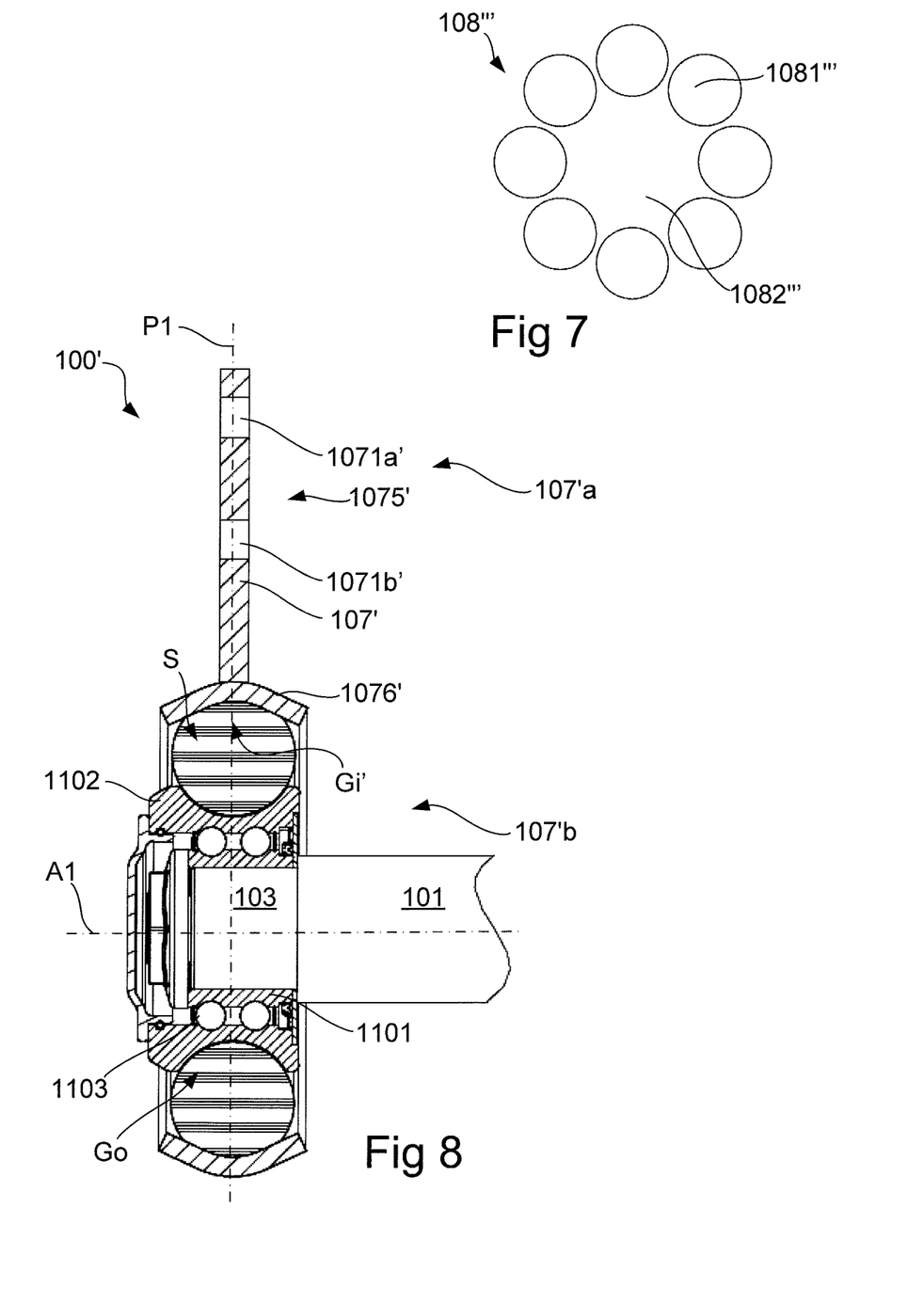
FIG. 7 is a schematic plan view of a third embodiment of a spring element which can be used in the suspension device in FIGS. 2-4.
FIG. 8 is a schematic sectional view of an alternative embodiment of a suspension device.

According to an embodiment shown in FIG. 7, the spring element 108''' can comprise a plurality of spring element parts 1081''', which can have the form of balls made of resilient material and which can be arranged adjacent to one another along the grooves Gi, Go or jointly fixed at predefined angular positions in a plane the normal to which is constituted by the rotational axis A1 of the bearing. The bearing is thus arranged in a center hole 1082''', which is defined by the group of spring element parts 1081'''. The angular positions can be fixed with the aid of the above-described radially inwardly extending protrusions in the groove Gi and/or with the aid of radially outwardly extending protrusions in the groove Go and/or with the aid of a separate connecting part, similar to the type of ball cage which is often used in ball bearings.

Figure 9:
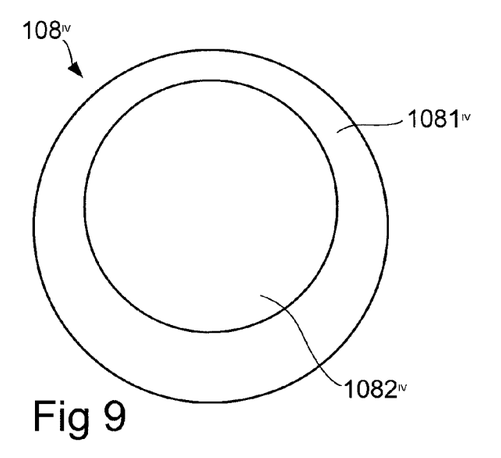
FIG. 9 is a schematic plan view of a fourth embodiment of a spring element which can be used in the suspension device in FIGS. 2-4.

The spring element $108^{IV}$ shown in FIG. 9 is asymmetrical insofar as it has a center hole $1082^{IV}$ which is radially displaced in relation to the periphery of the spring body $1081^{IV}$. A spring element having a differently long spring travel in different directions is thereby achieved.

The spring elements according to the above can be solid, hollow or even partially open (such as C- or U-shaped). In FIG. 8 is shown a non-claimed suspension device 100' having an alternative embodiment of a holder 107', in which the holder is configured as a single part, which is permanently composed of a mounting portion 1075' and a spring receiving portion 1076'. The mounting portion 1075' can be substantially flat, while the spring receiving portion 1076' can be substantially circular about the axis A1 (i.e. in the plane P1) and can have at least one inner surface which is curved in an axial plane (a plane containing the axis A1—FIG. 8) and which forms the groove Gi'. The outer surface of the spring receiving portion can also be curved in the axial plane.

The mounting portion 1075' can be formed by a flat blank, for example of metal. The spring receiving portion can be formed by a tubular portion, having a length roughly corresponding to the axial length of the bearing unit 110, wherein the wall of the tube is shaped such that a curvature in the axial plane is achieved. Such shaping can be effected by, for example, compression molding. The portions 1075', 1076' can be joined together by, for example, welding or soldering.

Casting of the portions 1075', 1076', followed by joining together according to the above, or casting of the whole of the alternative holder 107' in one piece, are other alternatives.

In the suspension device 100' shown in FIG. 8, the bearing and its fastening and sealing against the axle 101 can be identical with that which is shown and described with reference to FIG. 4.

Mounting of the suspension device 100' shown in FIG. 8 can be achieved by substantially axial pressing, in the same way as has been described above regarding mounting of the spring element 108 on the bearing unit 110. Alternatively, the shaping of the spring receiving portion 1076' can take place wholly or partially after the spring element 108 has been positioned in the portion 1076'.

Figure 10:
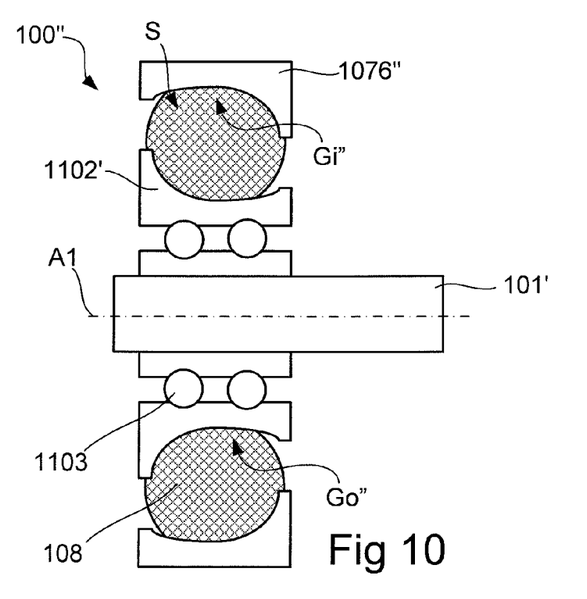
FIG. 10 is a schematic sectional view of another alternative embodiment of a suspension device.

In FIG. 10 is further shown an alternative non-claimed embodiment of a suspension unit 100", which is suited to absorbing larger axial loads on the axle 101' in one direction (to the right in FIG. 10) than in the other direction. In this embodiment, at least one of the radially outwardly open groove Go" and the radially inwardly open groove Gi" is therefore asymmetrical, insofar as the walls which delimit the groove in the axial direction are of different height relative to the deepest portion of the groove Gi", Go".

A thus modified groove Go" can therefore be present on the outer race 1102' either together with a normal groove Gi, Gi' (which is shown in FIGS. 4, 8) in the holder 1076, 1076', or together with a modified groove Gi" in the holder 1076".

In the same way, a modified groove Gi" can be present in the holder 1076" together with a normal groove Go or modified groove Go" in the outer race 1102, 1102'.

The holder or the holder parts can have holes 1111a, 1111b, 1111c, 1111d; 1071a, 1071b for fastening of the suspension device 100 relative to the frame 11 of the agricultural implement 1 with the aid of a screw joint, bolt joint or some other preferably releasable joint.

An implement 10 is arranged typically on the axle 101, so that rotation of the implement relative to the frame is achieved via the bearing unit 110 and other relative movement (damped and sprung translatory movement) between the implement 10 and the frame 11 is achieved via the spring element 108, 108', 108''.

In the description above, the implement is shown in the form of a compacting roller, but the suspension device shown can also be used for other rotatable implements, such as disk implements (harrow disks, sowing disks), compactor wheels, etc.

The suspension devices according to the above find particular application in respect of implements comprising at least one axle, which axle has two, three or more, in at least the lateral direction, separate fastenings relative to the frame. For example, an axle can have a suspension device according to the above at the respective end. According to a further example, an axle can have a suspension device on an intermediate portion. According to another example, a shorter axle can be provided with just one suspension device according to that which has been described above.

As a non-limiting example, a suspension device according to that which has been described above can be used for cushioning between a tool and a main frame 11, a side section frame 11aL, 11aR, or an implement frame (such as a roller frame) 11bL, 11bR.

Figures 11A, 11B, 11C:
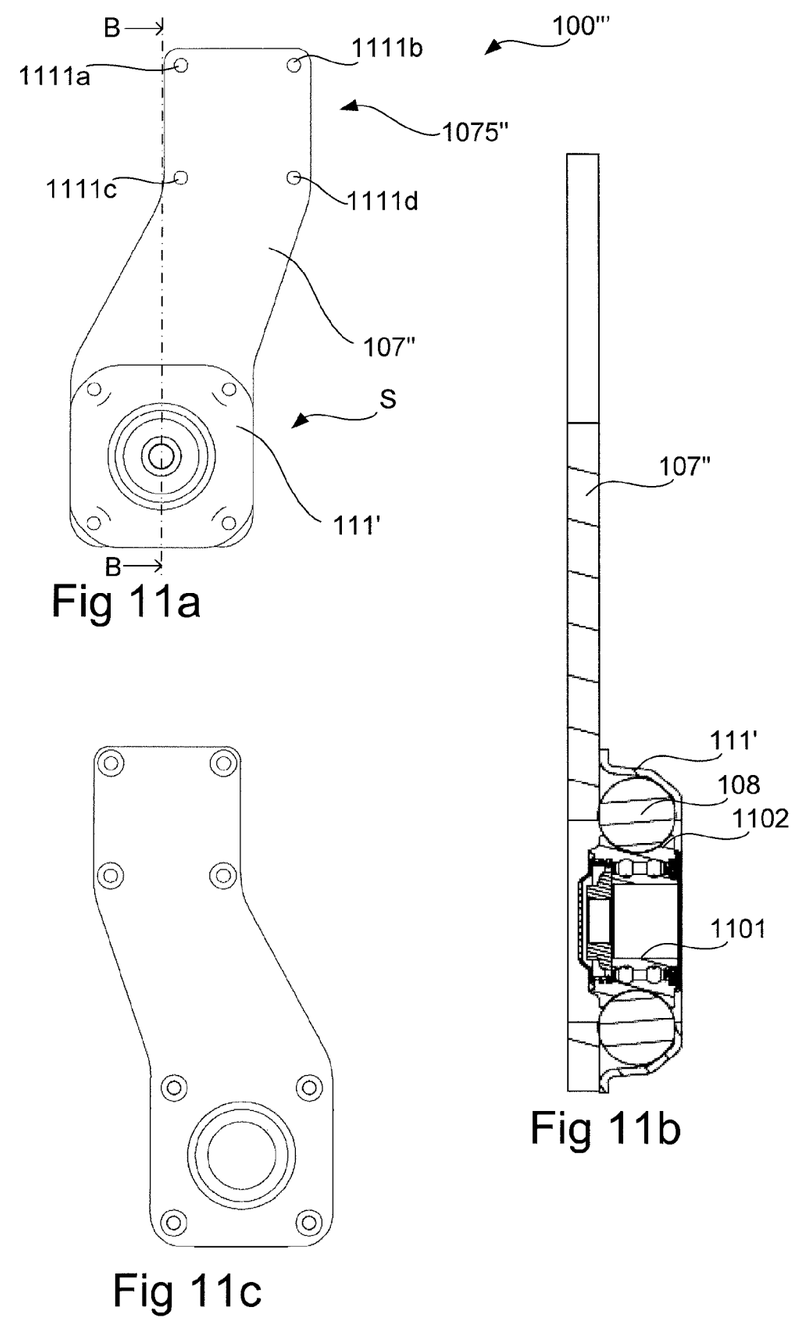
FIGS. 11a-11c show a fifth embodiment of a suspension device.

In FIGS. 11a-11c is further shown a variant of the suspension device 100''', comprising a first holder part 107'' which alone forms the mounting portion 1075'' and which forms a part of a spring receiving portion S. A second holder part 111' forms the remaining part of the spring receiving portion S.

That part of the first holder part 107'' which forms the spring receiving portion S can be substantially flat. According to the embodiment shown, the whole of the holder part 1076'' is flat, but this is not necessary.

The second holder part 111' can form an axial limit surface for the spring receiving portion S, which, viewed in the axial direction, lies opposite a part of the first holder part 107''.

The second holder part 111' can also form a radial limit surface for the spring receiving portion S. In the embodiment shown, the second holder part 111' defines substantially the whole of the spring receiving chamber 1076'', wherein the first holder part 107'' forms a "cover".

In the embodiments shown with reference to FIGS. 2-6 and 11a-11c respectively, at least one of the holder parts 107, 111; 107'; 107'', 111' can be formed by a flat metal blank, which has been cut to size and shaped. The cutting to size can be achieved, for example, by laser cutting or stamping and examples of shaping methods are deep pressing or deep drawing. It is also conceivable to perform a combined stamping and pressing operation.

In the embodiment according to FIGS. 2-6, both holder parts 107, 111 can thus be formed by a flat metal blank in the form of a metal sheet, the thickness of which is around 2-10 mm, preferably around 3-7 mm, by laser cutting, and thereafter shaped by deep pressing or deep drawing.

In the embodiment according to FIGS. 11a-11c, one holder part 111' is formed by a flat metal blank in the form of a metal sheet, the thickness of which is around 2-10 mm, preferably around 3-7 mm, by laser cutting, and thereafter shaped by deep pressing or deep drawing. The second holder part 107'' can be formed by a flat metal blank, which has only been cut to size but has otherwise been allowed to be flat. The second holder part 107'' can have greater material thickness than the first holder part 111', for example around 2-10 times greater, 2-7 times greater or 3-5 times greater.

The invention claimed is:

1. An agricultural implement comprising a suspension unit, which suspension unit is arranged for cushioning between a rotatable soil engaging or tilling part and a frame of the agricultural implement, comprising:
    a bearing unit comprising:
        an inner sleeve and an outer sleeve which is rotatable relative to said inner sleeve, and
        a friction-reducing member arranged between the inner sleeve and the outer sleeve;
    a spring element, arranged radially outside the outer sleeve; and
    a holder which forms a spring chamber in which the spring element is accommodated,
    wherein the spring element is fixed in the spring chamber between a circumferential, radially outwardly open groove, which is integrated with the outer sleeve, and a radially inwardly open groove, which surrounds the outer sleeve,
    wherein the holder comprises first and second holder parts, which in a joined-together state form the spring chamber,
    the holder parts are joined together along a plane which is substantially perpendicular to a rotational axis of the bearing unit,
    at least one of the holder parts has a substantially flat portion and a, relative to the flat portion, countersunk portion, which forms a part of the spring chamber,
    wherein the holder parts are configured as a pair of mirror-inverted parts, or as a pair of identical parts, or
    wherein the holder parts are configured as a first substantially flat part and a second part having the flat portion and the countersunk portion, wherein the countersunk portion defines a whole of the spring chamber for the spring element, and
    wherein at least one of the holder parts is formed by a predefined cut to size and shape of a flat metal blank.

2. The agricultural implement as claimed in claim 1, wherein the radially inwardly open groove is formed by the holder.

3. The agricultural implement as claimed in claim 1, wherein the radially outwardly open groove is formed in one piece with the outer sleeve.

4. The agricultural implement as claimed in claim 1, wherein at least one of the holder parts is formed by a flat metal blank in the form of a metal sheet, the thickness of which is 2-10 mm, which has been shaped by deep pressing or deep drawing.

5. The agricultural implement as claimed in claim 4, wherein both holder parts have a substantially flat portion and a, relative to the flat portion, countersunk portion, which forms a part of the spring chamber.

6. The agricultural implement as claimed in claim 1, wherein the spring element comprises at least one material body, which at least partially is situated radially outside the outer sleeve.

7. The agricultural implement as claimed in claim 6, wherein the at least one material body comprises rubber.

8. The agricultural implement as claimed in claim 1, wherein the radially outwardly open groove has a radius of curvature in an axial plane which is larger than a largest radial thickness of the outer sleeve.

9. The agricultural implement as claimed in claim 1, wherein the radially outwardly open groove has a radius of curvature in an axial plane which is at least 10% of an axial width of the outer sleeve.

10. The agricultural implement as claimed in claim 9, wherein the radially outwardly open groove has a radius of curvature in an axial plane which is at least 20% of an axial width of the outer sleeve.

11. The agricultural implement as claimed in claim 1, wherein the spring element, when received in the spring chamber, is at least partially radially and/or axially compressed.

12. The agricultural implement as claimed in claim 1, wherein the rotatable soil engaging or tilling part is connected to the frame by at least two suspension units.

13. The agricultural implement as claimed in claim 1, wherein at least one of the holder parts is formed by a compression-molded flat metal blank.

14. The agricultural implement as claimed in claim 13, wherein the compression-molded flat metal blank comprises a compression-molded metal sheet.

15. The agricultural implement as claimed in claim 1, wherein the flat metal blank comprises metal sheet.

16. A method of manufacturing a suspension unit for an agricultural implement, comprising:

provide a bearing unit comprising an inner sleeve and an outer sleeve which is rotatable relative to said inner sleeve, positioning a spring element in a circumferential, radially outwardly open groove integrated with the outer sleeve, so that the spring element is substantially fixed both axially and radially relative to the outer sleeve, axially clamping the spring element in a spring chamber which is formed in a holder, so that the spring element is substantially fixed both axially and radially relative to the spring chamber, forming the holder by providing first and second holder parts, which in a joined-together state form the spring chamber, and joining together the holder parts along a plane which is substantially perpendicular to a rotational axis of the bearing unit, so that the spring element is clamped at least axially between the holder parts, forming at least one of the holder parts by shaping a flat metal blank so that the holder part forms at least a part of the spring chamber, and mounting the bearing unit for cushioning between a rotatable soil engaging or tilling part and a frame of the agricultural implement.

\* \* \* \* \*